Dec. 2, 1969   M. M. McQUEEN   3,481,356
REDUNDANT PRESSURE REGULATING SYSTEM
Filed May 24, 1966   2 Sheets-Sheet 2
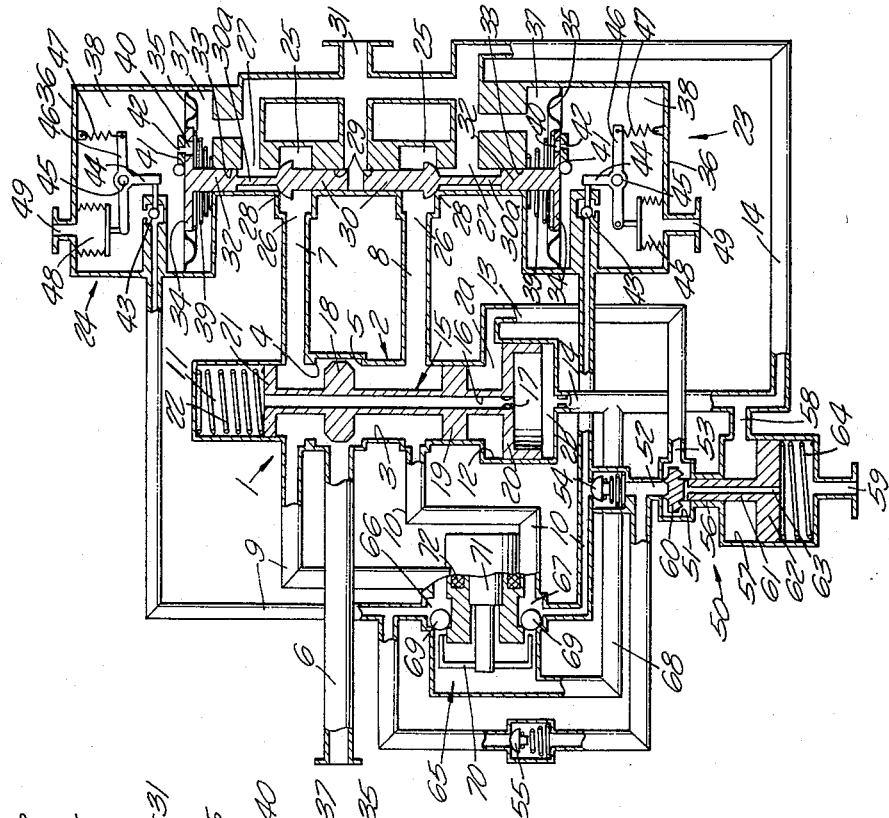
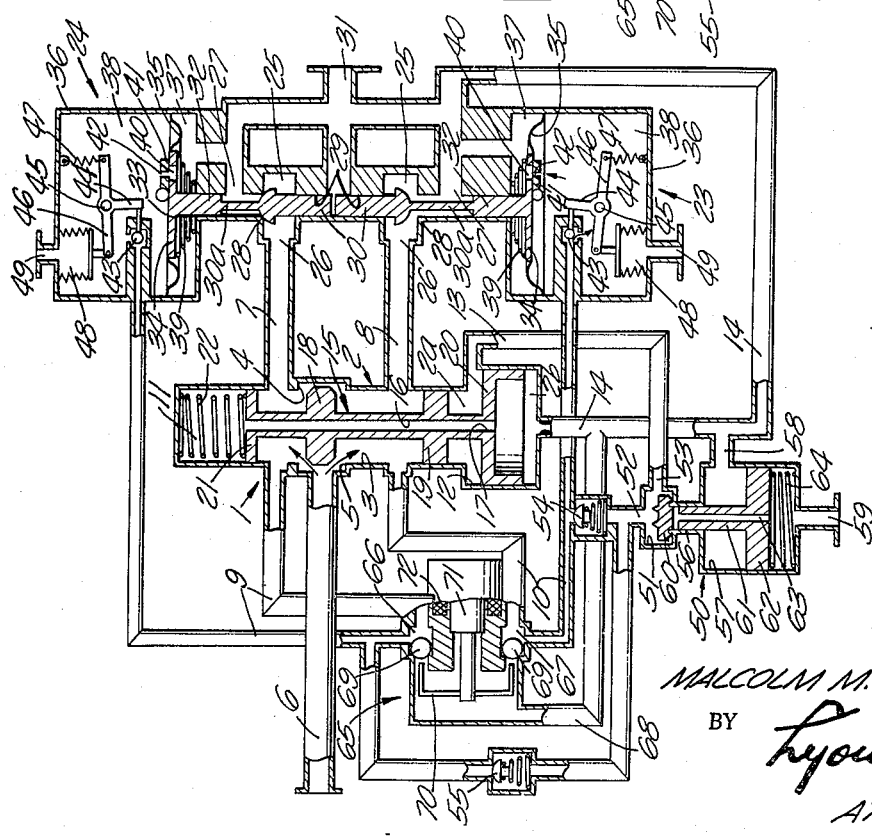
INVENTOR.
MALCOLM M. McQUEEN
BY Lyon & Lyon
ATTORNEYS

United States Patent Office 3,481,356
Patented Dec. 2, 1969

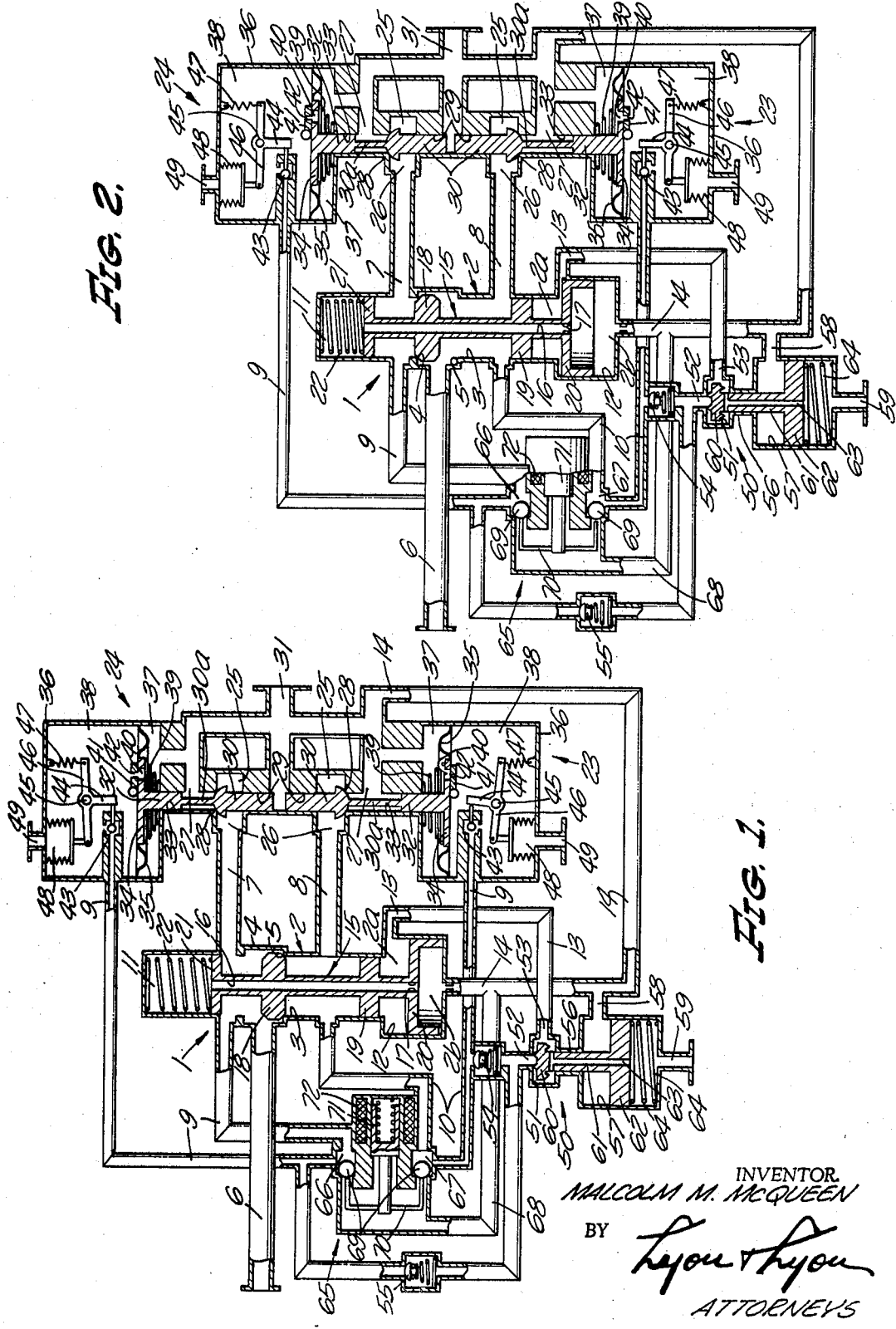

---

3,481,356
REDUNDANT PRESSURE REGULATING SYSTEM
Malcolm M. McQueen, Northridge, Calif., assignor to Whittaker Corporation, Los Angeles, Calif., a corporation of California
Filed May 24, 1966, Ser. No. 552,510
Int. Cl. F15b 20/00, 18/00; G05b 11/58
U.S. Cl. 137—110         14 Claims

ABSTRACT OF THE DISCLOSURE

A redundant pressure regulating system which utilizes a main pressure regulator and a similar standby pressure regulator, both communicating with a common outlet. A selector valve having an inlet for pressure and a pair of outlets communicating individually with the two pressure regulators is provided internally with a valve armature movable between a first position for supplying fluid to the main pressure regulator and a second position for supplying the fluid to the standby regulator. The selector is sensitive to a predetermined change in regulated pressure at the downstream end of the main regulator to effect shift to its second position and cause operation of the standby regulator.

---

This invention relates to redundant pressure regulating systems and included in the objects of this invention are:

First, to provide a pressure regulating system which employs a primary pressure regulator and a secondary or stand-by regulator which is caused to operate should the primary regulator fail in either its open or closed position.

Second, to provide a pressure regulating system of this type which may occupy a neutral condition in absence of fluid pressure, but which is caused to assume its operating condition merely by the supply of fluid under pressure, the primary regulator automatically assuming its operating condition and the stand-by regulator automatically assuming its stand-by condition.

Third, to provide a redundant pressure regulator system which is essentially mechanical in operation; that is, no electrical power is required either under normal or emergency operation.

With the above and other objects in view, as may appear hereinafter, reference is directed to the accompanying drawings in which:

FIGURE 1 is a diagrammatical view of the redundant pressure regulating system shown in its assembled, unpressurized condition.

FIGURE 2 is a similar diagrammatical view showing the regulating system in its normal operating condition with the main regulator functioning and the stand-by regulator in its stand-by condition.

FIGURE 3 is a similar diagrammatical view, showing the regulating system in the condition wherein the main regulator has failed in its open position and the system is in the process of changeover to control by means of the stand-by regulator.

FIGURE 4 is a similar diagrammatical view, showing the condition in which the main regulator has failed in a closed position and the system is in the process of changeover to operation by the stand-by regulator.

The redundant pressure regulating system includes a selector valve or shuttle valve 1, contained in a valve body 2, having a longitudinal bore 3. Formed in the bore are opposed valve seats 4 and 5.

The valve body is intersected at one side between the valve seats 4 and 5 by a fluid inlet line 6. The valve body is also intersected at points axially displaced from the valve seats 4 and 5 by regulator supply lines 7 and 8. In the region of the supply lines 7 and 8, the valve body is also intersected by regulator control lines 9 and 10.

One axial end of the valve body 2 is closed and forms a counterbalance chamber 11. The other end of the valve body forms an enlarged portion 12. The enlarged portion is intersected at one side by a pilot valve line 13 and is intersected at its axial end by a downstream pressure line 14.

The valve body receives an armature 15 having a small passage 16, extending the length thereof. A constriction 17 is provided in the passage 16. The armature includes a valve disk 18 located between the valve seats 4 and 5 and provided with the cooperating valve faces so that the fluid flow may be directed selectively to either of the supply lines 7 and 8 and their corresponding regulator control lines 9 and 10.

Between the supply line 8 and the enlarged portion 12, the armature is provided with a piston 19. Within the enlarged portion 12, the armature is provided with a piston 20. A third piston 21 is located in the counterbalance chamber 11. A spring 22, located in the counterbalance chamber 11, urges the armature in a direction to open flow to the regulator supply line 7 and close flow to the supply line 8.

A main pressure regulator 23 and a stand-by pressure regulator 24 are provided. The regulators are identical. Each regulator includes a valve chamber 25, having an inlet 26 and an outlet 27 between which is interposed a valve seat 28. The outlets 27 of the two valve chambers 25 are in axial alignment and also in axial alignment are guide bores 29 for poppet valves 30. The valve seats 28 face in opposite directions and the outlets 27 communicate with a common discharge passage 31.

The remote ends of the valves 30 are provided with reduced valve stems 30a which are in turn joined to guide stems 32, slideable in guide bores 33 which are in alignment with the guide bores 29. The guide stems terminate in flanges 34 which are attached to diaphragms 35. Each diaphragm 35 is mounted within a housing 36 and divides the housing into a downstream exposed chamber 37, communicating with the discharge passage 31 and a control chamber 38. A spring 39 located in the chamber 37 urges the corresponding poppet valve 30 in a direction to close against its valve seat 28.

Each flange 34 is provided with a port 40 controlled by a flap valve 41 located in the control chamber 38 and provided with a small bleed port 42.

Located in the control chamber 38 is a pilot valve 43, the inlet end of which is connected to a corresponding regulator control line 9 or 10.

Mounted in each control chamber 38 is a pilot valve operating lever 44 pivoted on a pin 45. The lever 44 is engageable with the pilot valve to urge the valve toward its closed position. Pressure in the corresponding control line urges the pilot valve toward its open position. Each lever 44 is provided with a crossbar 46, one end of which is attached to a spring 47 and the other end of which is attached to a bellows 48. The interior of the bellows is isolated from the control chamber, but is provided with a port 49 which exposes the interior of the bellows to ambient pressures.

A transfer pilot valve 50 is provided. The transfer pilot valve includes a valve chamber 51 having an end inlet 52 and a side outlet 53. The side outlet is connected to the pilot valve line 13. The end inlet is connected through a check valve 54 to the control line 10 leading to the pilot valve of the main regulator 23. The inlet 52 is also connected through a check valve 55 to the control line 9 connected to the pilot valve 43 of the stand-by regulator 24.

A guide tube 56 connects the valve chamber 51 to an enlarged cylinder 57. The cylinder 57 is provided with a side port 58 which communicates with the downstream pressure line 14 leading to the common outlet 31 of the regulators 23 and 24. The end wall of the cylinder 57, remote from the valve chamber 51 is provided with a port 59 exposed to ambient pressures.

Mounted within the valve chamber 51 is a valve disk 60 which is double acting, that is the valve disk is provided with a smaller valve seat engageable with one end wall of the valve chamber to close the inlet 52 and a larger valve seat engageable with the opposite end of the valve chamber to close the guide tube 56. The valve disk 60 is attached to a stem 61 which extends through the guide tube 56 and is joined to a piston 62 mounted in the cylinder 57. A small passage 63 extends through the stem 61 to a point adjacent the valve disk 60. A spring 64 urges the valve disk 60 in a direction to close the inlet 52.

A shutoff valve 65 is provided. The shutoff valve includes a pair of valve chambers 66 and 67 which are interposed in the control lines 9 and 10 respectively. The valve chambers are also connected to a branch line 68 which in turn is connected to the downstream pressure line 14. The valve chambers are provided with opposed seats so arranged that the pilot valves 43 of the regulators may be connected to the shuttle valve 1 or to the downstream pressure line 14. Double action valve elements 69 normally close communication between the valve chambers 66 and 67 and the downstream pressure line 14. The valve elements 69 are engageable by a yolk 70 connected to an armature 71 of a solenoid 72.

Operation of the redundant pressure regulating system is as follows:

Before this system is placed in operation, the moving parts occupy the position shown in FIGURE 1. The poppet valves 30 are closed, the pilot valves 43 are open, the selector valve is in its lower or second position in that line 6 communicates with the stand-by valve. The transfer valve is in its upper position so that the chamber 2a between pistons 19 and 20 of the selector valve is exposed to ambient pressures. The chamber 2b, formed below the piston 20 is at all times exposed to downstream pressure. The regulator control lines 9 and 10 are open between the selector valve 1 and the pilot valves 43.

When fluid under pressure is supplied to the inlet 6, the stand-by valve opens and its control chamber is pressurized. Back pressure at the outlet 31 causes back flow through the flap valve 41 of the main regulator pressurizing its control chamber 38. Back pressure at the outlet 31 also pressurizes the chamber 2b below the piston 20 causing the armature 15 to move to its upper or first position so that fluid is now supplied to the main regulator. Flow through the control line 9 to the stand-by regulator is shut off. However, the control chamber of the stand-by regulator is pressurized by reason of back flow through its flap valve 41 to the extent that the bellows 48 collapses causing the lever 44 to close the pilot valve 43.

The pressure regulating system is now in its normal condition of operation. If the regulated fluid pressure at the outlet 31 drops, pressure in the control chamber 38 is bled through the port 42, causing the pilot valve 43 to open, thereby causing the regualtor valve to move in a direction to supply additional fluid until the pressure at the outlet 31 reaches a predetermined upper level whereupon the main regulator closes. Thus under normal conditions the main regulator modulates in accordance with the demand downstream of the outlet 31.

Should the main regulator fail in its open position, as represented in FIGURE 3, the pressure at the outlet 31 rises, increasing the pressure in the cylinder 57 above the piston 62, causing a pressure buildup in the chamber 2b. The proportions of the chambers 2a and 2b are such that when both are pressurized to the same pressure, the force exerted by the spring 22 is sufficient to move the armature 15 from its first or upper position to its second or lower position, thereby diverting flow from the inlet 6 to the stand-by regulator, whereupon the stand-by regulator takes over the functions of the main regulator.

Should the main regulator fail in its closed position, the demand downstream of the outlet 27 causes the regulated pressure to drop and causing the pressure in chamber 2b to drop until the spring 22 forces the selector valve to its lower or second position so that the fluid from the inlet 6 is supplied to the stand-by regulator causing the stand-by regulator to take over the functions of the main regulator.

I claim:
1. A redundant pressure regulating system, comprising:
  (a) a main pressure regulator and a similar stand-by pressure regulator communicating with a common outlet for fluid to be maintained within a selected pressure range;
  (b) a selector valve having an inlet for pressure fluid and a pair of outlets communicating individually with said regulators, and a valve armature movable between a first position for supplying pressure fluid to said main regulator and a second position for supplying fluid to said stand-by regulator;
  (c) and transfer means responsive to a predetermined change in the regulated pressure of the fluid discharged from said main regulator for causing said selector valve armature to shift from its first position to its second position.

2. A redundant pressure regulating system according to claim 1, wherein said transfer means includes:
  (a) a transfer pilot valve sensitive to the pressure of fluid at said main regulator outlet in excess of said selected pressure range and connected to said selector valve to cause said armature to move from its first position to its second position.

3. A redundant pressure regulating system according to claim 1, wherein said transfer means includes:
  (a) yieldable means responsive to a drop in the pressure at said outlet below said selected pressure range for urging said armature from said first position to said second position.

4. A redundant pressure regulating system according to claim 1, which further includes:
  (a) a shut-off valve connected to said main and stand-by regulators and operable to cause both of said regulators to close and remain non-responsive to downstream pressure.

5. A redundant pressure regulating system comprising:
  (a) a main pressure regulator and a similar standby pressure regulator;
  (b) each regulator including an upstream side and a downstream side, a valve means having a movable element for controlling the flow of a pressure fluid between said upstream side and said downstream side, a diaphragm connected to said movable element, means including said diaphragm defining a pressure chamber, a pilot valve communicating with said pressure chamber, and a bleed port communicating between said pressure chamber and the downstream side of said regulator cooperating with said pilot valve to effect control of the fluid pressure downstream of said regulator, the downstream sides of said regulators being connected to a common region requiring regulated fluid pressure;
  (c) a selector valve having an inlet means for pressure fluid, and dual outlet means communicating individually with the upstream side of said pressure regulators and their respective pilot valves, and a valve armature for controlling said inlet and outlet means, said valve armature being movable between a first position for supplying pressure fluid to the upstream side of the valve means and to the pilot valve of said main pressure regulator, and a second position for supplying pressure fluid to the upstream side of the valve means and to the pilot valve of said standby pressure regulator;

(d) and transfer means responsive to a predetermined change in the regulated pressure of the fluid discharged said main pressure regulator for causing said selector valve armature to shift from its first position to said second position.

6. A redundant pressure regulating system according to claim 5 wherein said transfer means includes:
   (a) a transfer pilot valve sensitive to the pressure of the fluid downstream of said regulators in excess of the regulated pressure thereof and connected to said selector valve to cause said armature to move from its first position to its second position.

7. A redundant pressure regulating system according to claim 6, wherein:
   (a) said transfer pilot valve includes a piston, exposed at one side to ambient pressure to vary the pressure at which said transfer pilot valve operates in accordance with change in ambient pressure.

8. A redundant pressure regulating system according to claim 5 wherein said transfer means includes:
   (a) yieldable means responsive to a drop in the pressure of the fluid downstream of said regulators below the regulated pressure thereof for urging said armature from its first position to its second position.

9. A redundant pressure regulating system according to claim 5, which further includes:
   (a) a shut-off valve connected to said main and stand-by regulators and operable to close both of said regulators and remain non-responsive to downstream pressure.

10. A redundant pressure regulating system according to claim 5 wherein:
    (a) each pressure regulator includes means in its pressure chamber responsive to ambient pressure and connected with said valve means to vary the pressure at which said pilot valve operates in accordance with change in ambient pressure.

11. A redundant pressure regulating system comprising:
    (a) a main pressure regulator and a similar stand-by pressure regulator communicating with a common outlet for fluid to be maintained within a selected pressure range;
    (b) a selector valve including a valve body having a fluid inlet and a pair of outlets axially displaced in opposite directions from said inlet and communicating individually with said regulators; a valve armature movable between a first position for supplying fluid to said main regulator while closing flow to said stand-by regulator, and a second position for supplying fluid to said stand-by regulator while closing flow to said main regulator; a first pressure chamber defined by said valve body and armature exposed to pressure downstream of said regulators, to move said armature to its first position; a second pressure chamber defined by said valve body and armature tending, when pressurized, to move said armature from its first to its second position; and yieldable means also urging said armature from its first position to its second position;
    (c) and a transfer means responsive to a predetermined change in the regulated pressure of the fluid downstream from said main regulator for causing said selector valve armature to shift from its first position to its second position thereby to deactivate said main regulator and to activate said sand-by regulator.

12. A redundant pressure regulating system according to claim 11, wherein said transfer means includes:
    (a) a transfer pilot valve sensitive to pressure fluid downstream of said main regulator in excess of said selected pressure range for applying pressure fluid to said second pressure chamber, thereby to cause said armature to assume its second position.

13. A redundant pressure regulating system according to claim 11, wherein said transfer means includes:
    (a) the yieldable means of said selector valve and said first pressure chamber when exposed to a predetermined drop in the pressure fluid downstream of said regulators.

14. A redundant pressure regulating system according to claim 11, which further includes:
    (a) a shut-off valve connected to said main and stand-by regulators and operable to cause both of said regulators to close and remain non-responsive to downstream pressure.

References Cited

UNITED STATES PATENTS

| | | | |
|---|---|---|---|
| 2,145,774 | 1/1939 | Muffly | 137—110 X |
| 2,182,724 | 12/1939 | Hennessy | 137—601 |
| 2,314,279 | 3/1943 | Jones | 137—110 X |
| 3,057,377 | 10/1962 | Chatham et al. | 137—119 X |
| 3,103,228 | 9/1963 | Davenport | 137—115 X |

WILLIAM F. O'DEA, Primary Examiner

DAVID J. ZOBKIW, Assistant Examiner